(12) United States Patent
Low

(10) Patent No.: US 6,419,210 B1
(45) Date of Patent: Jul. 16, 2002

(54) REVERSED-JET CONTACTING OF A GAS STREAM HAVING VARIABLE HEAT/MASS CONTENT

(76) Inventor: David Nicholson Low, 1425 Athens Rd., Wilmington, DE (US) 19803

( * ) Notice: Subject to any disclaimer, the term of this patent is extended or adjusted under 35 U.S.C. 154(b) by 0 days.

(21) Appl. No.: 09/350,447

(22) Filed: Jul. 9, 1999

(51) Int. Cl.$^7$ .................................................. B01F 3/04
(52) U.S. Cl. ..................... 261/62; 261/117; 261/DIG. 9
(58) Field of Search ........................... 261/62, 117, 115, 261/DIG. 9

(56) References Cited

U.S. PATENT DOCUMENTS

| | | | | |
|---|---|---|---|---|
| 816,371 A | * | 3/1906 | Platz | 261/117 |
| 1,607,052 A | * | 11/1926 | Brinkman | 261/62 X |
| 2,578,199 A | * | 12/1951 | Naab | 261/117 X |
| 3,116,348 A | * | 12/1963 | Walker | 261/62 X |
| 3,163,498 A | * | 12/1964 | Lisankie et al. | 261/117 X |
| 3,544,086 A | * | 12/1970 | Willett | 261/62 |
| 3,767,174 A | * | 10/1973 | Heeney | 261/62 |
| 3,803,805 A | | 4/1974 | Low | 261/117 X |
| 4,066,424 A | | 1/1978 | Kilgren et al. | 95/233 |
| 4,260,563 A | * | 4/1981 | Brulhet | 261/115 X |
| 4,374,813 A | | 2/1983 | Chen et al. | 423/243.08 |
| 4,400,184 A | * | 8/1983 | Tomita et al. | 261/DIG. 9 |
| 4,479,908 A | * | 10/1984 | Arbeille et al. | 261/62 |
| 4,963,329 A | * | 10/1990 | Burgess et al. | 261/117 X |
| 5,512,097 A | | 4/1996 | Wiemmer | 106/745 |

FOREIGN PATENT DOCUMENTS

| IT | 369588 | * | 3/1939 | 261/117 |
|---|---|---|---|---|

* cited by examiner

*Primary Examiner*—Richard L. Chiesa

(57) ABSTRACT

This invention is a combination spray nozzle and throttle valve referred to as a nozzle valve. Its primary use is to characterize the spray pattern and vary the flow rate of the spray in a reversed jet installation where rate of flow in the spray must be varied to meet process requirements. Energy for contacting liquid and gas phases in a reversed jet installation comes from the kinetic energy of the jet spray. The improvement a nozzle valve provides is that the kinetic energy of the spray from the nozzle valve is substantially equal to the potential energy of its supply liquid at all flow rates. A number of spray characterizations are available to match the nozzle valve to a particular reversed jet installation. By these improvements the energy to the contact zone of a reversed jet system can be maintained at a constant maximum value on a unit mass flow basis over a wide range of spray flow rates.

7 Claims, 4 Drawing Sheets

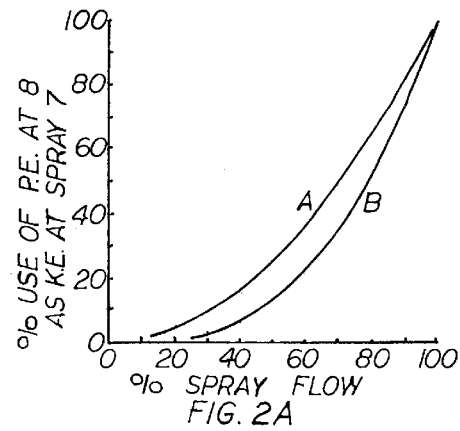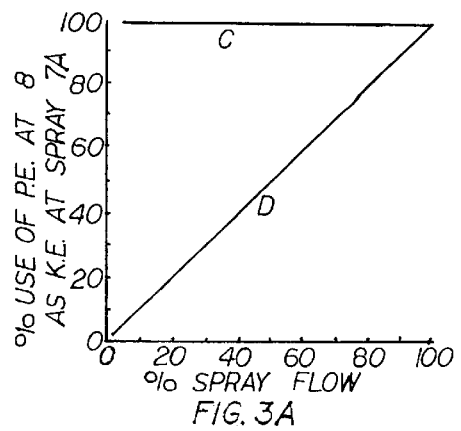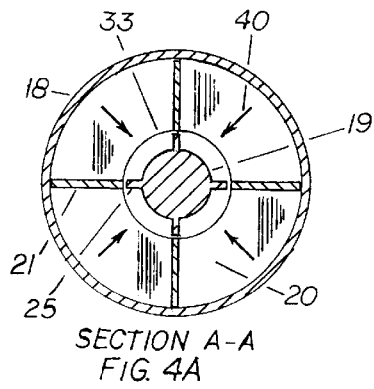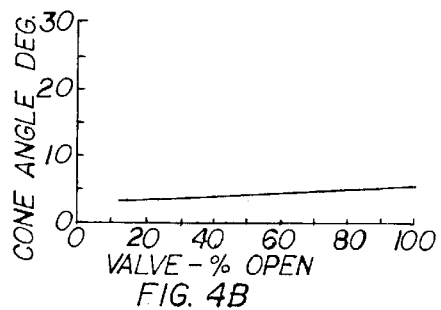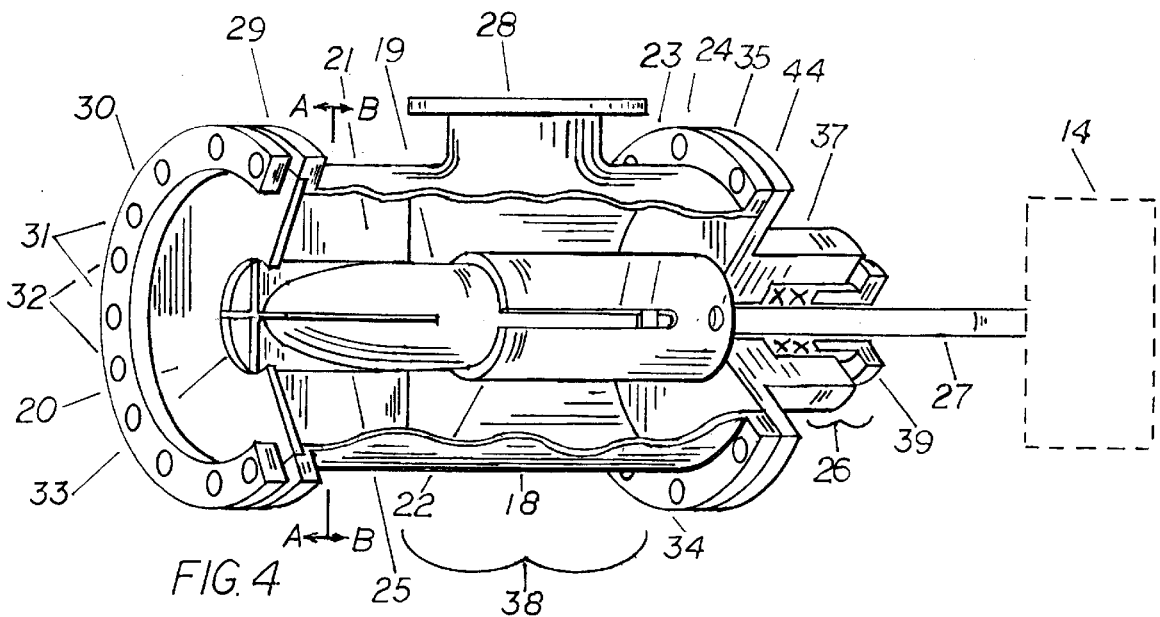

SECTION A-A

SECTION A-A

SECTION B-B

REVERSED-JET CONTACTING OF A GAS STREAM HAVING VARIABLE HEAT/MASS CONTENT

BACKGROUND—FIELD OF THE INVENTION

This invention is intended to improve liquid-to-gas contacting in a reversed jet installation where the jet flow must be throttled for process control reasons.

Reversed jets (also known as counter-current sprays) are used where it is desired to intimately mix or contact a liquid with a continuously flowing gas stream. The velocity of the gas stream must be high enough to reverse the direction of the sprayed liquid within the confinement of the wall of the gas's conveying pipe or duct. Typical, but not limiting, uses for a reversed jet are for scrubbing particulate from a gas stream and/or for heating or cooling a gas stream.

BACKGROUND—DESCRIPTION OF PRIOR ART

Figure 1:
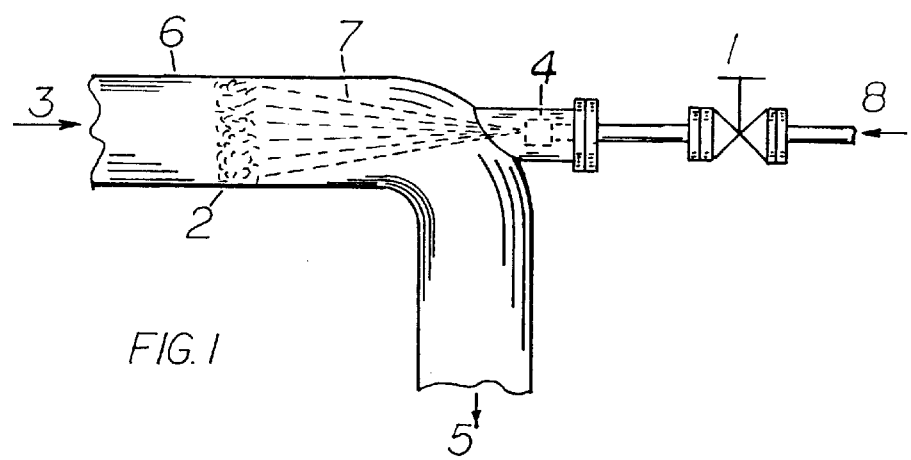

FIG. 1 shows a reversed jet installation using a convenient process pipe elbow to mount the reversed jet's spray nozzle. A stream of gas 3 passes through a section of process pipe 6. A liquid under a pressure 8 is sprayed as a jet 7 through a noble 4 into gas stream 3 in a direction opposite to that of gas stream 3. The velocity of gas stream 3 must be at least great enough to cause an abrupt reversal of spray 7 and to convey any residual droplets. This velocity is often called the minimum flooding velocity. For a water spray and air the minimum flooding velocity is typically 30 ft./sec at the wall of pipe 6. However, minimum flooding velocity can vary depending on the physical properties of the fluids and the operating conditions of the installation.

The liquid supply pressure at 8 can also vary but it is usually great enough to give spray 7 a velocity of at least 40 ft./sec. Typically, there is a relative velocity between the spray and the gas of at least 70 ft./sec. Spray 7 is usually a solid-cone type with a 15 to 20 degrees included angle. Liquid flow rate to nozzle 4 is determined by the nozzle's size and the difference between process pressure in pipe 6 and the liquid's supply pressure 8. A valve 1 is used simply for on-or-off control of flow to nozzle 4.

As drops of sprayed fluid 7 leave nozzle 4, they face a high relative velocity with respect to counter-current gas stream 3. This counter-current action continues with two factors acting to reduce the momentum of spray 7. (1) The high relative velocity between a drop and the gas causes the drop to shatter to smaller droplets with a net gain in surface area and with each resulting droplet having a smaller mass. With net higher surface giving increased drag to lower their velocity and individually less mass than the original drop, the droplets rapidly lose momentum against counter-current gas stream 3. (2) In addition, the momentum per unit cross sectional area of the cone-shaped spray reduces as spray 7 moves away from nozzle 4. It is believed that a contact zone 2 forms at the point where the momentum per unit cross sectional area of counter current spray cone 7 equals the momentum per unit area of gas 3. In contact zone 2 where droplets with high surface area are reversing their direction there is severe turbulence. This combination of small drops with their high interface surface area in a condition of high turbulence results in a rapid transfer of heat and mass between the liquid and gas phases.

Energy for shattering droplets in spray 7 and for maintaining a high degree of turbulence in contacting zone 2 is believed to be supplied by the kinetic energy of fluid jet 7 issuing from nozzle 4 (derived from D. Low U.S. Pat. No. 3,803,805 1974).

(1) In engineering units K.E.=W×V×V/2 g where:
W=pounds of fluid/sec.
V=fluid jet velocity in ft./sec.
g=32.2 feet/sec./sec.
K.E.=Kinetic energy of fluid jet in ft.-pounds/sec.
P.E.=Potential energy as represented by the difference between the static fluid supply pressure at 8 in FIGS. 1,2,3 and the static pressure in pipe 6.

From the above relationship it is evident that kinetic energy per unit mass of sprayed fluid for contacting gas 3 with spray 7 varies as the square of the spray's velocity as it issues from spray nozzle 4. Since ■W■ is also directly proportional to the spray's velocity, it is also evident that absolute or total kinetic energy in the spray varies as the cube of the spray's velocity.

As might be expected, a narrow-cone counter-current spray will penetrate farther into the gas stream than a wider cone spray. This is of particular importance in the elbow installation of FIG. 1 where the spray must pass through the elbow area so that contact zone 2 will form in the horizontal leg of pipe 6 which is needed to confine contact zone 2. It is also evident that a narrow angled spray cone is more suitable if the velocity of gas 3 is significantly higher than minimum flooding velocity.

The arrangements for a reversed jet as shown by FIG. 1 is satisfactory for an installation where the flow from nozzle 4 is constant, such as in a scrubbing application where particulate is removed from a gas. However, if the installation, for example, requires cooling an incoming gas stream 3 that varies in temperature and enthalpy to a predetermined final temperature, then the flow rate of spray 7 will be called upon to vary. This variation is presently done by automating valve 1 in FIG. 1 which then becomes FIG. 2. An automatic controller 10 in FIG. 2 now adjusts an automatic throttle valve 9 to vary liquid flow from nozzle 4 so as to maintain a predetermined temperature at a measuring point 11. Instrument control lines 12 allow communication to and from controller 10.

Figure 2:
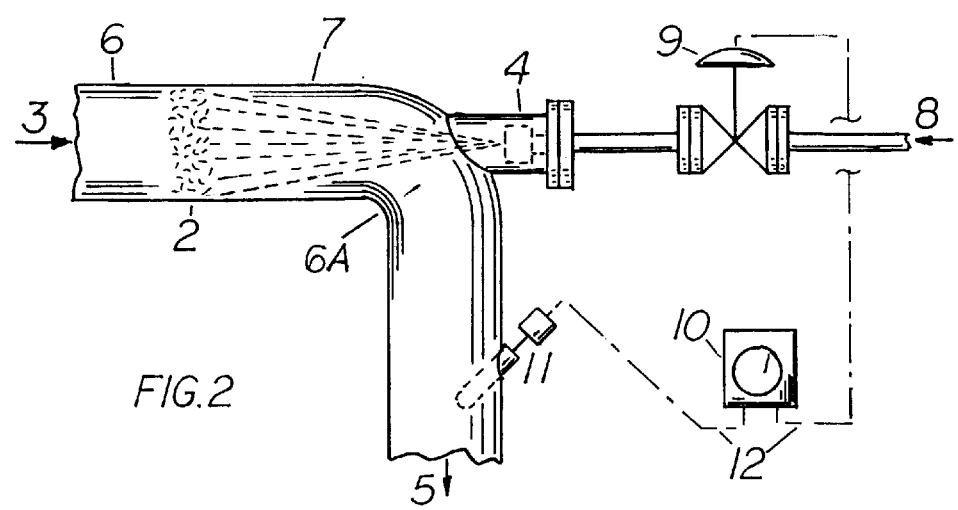

Using equation (1) for kinetic energy, FIG., 2A is a graphical representation of the kinetic energy in spray 7 as a function of flow when using the reversed jet configuration of FIG. 2. Curve A shows the decrease in kinetic energy in spray 7 per unit mass of the spray as a function of flow from spray nozzle 4. Curve B shows the total kinetic energy in spray 7 as a function of flow from spray nozzle 4. This total kinetic energy is important in propelling the spray to contact zone 2.

The arrangement in FIG. 2 will give good contacting between liquid and gas phases if variations in the heat or cooling load of incoming gas 3 are small, for example, from a 100% load down to a 90% load. However, if load changes are large, then the energy available for good contacting between the phases may be inadequate. For example, suppose in FIG. 2 during the start-up phase of an operation the cooling load of incoming gas 3 is only 20% or one fifth of its full load value. Then only one fifth as much liquid from nozzle 4 at one fifth the full-load jet velocity is needed to cool gas stream 3 to its final predetermined temperature at 11. Since energy on a unit mass basis for contacting in zone 2 varies as the square of the jet's velocity, there is only one twenty-fifth or 4% as much energy per unit mass of sprayed liquid 7 as for the spray used for full cooling load. This low energy in the sprayed fluid may give insufficient contacting between gas 3 and spray 7 for the mixture to equilibrate before it reaches temperature measuring point 11. In this example most of the spray fluid's potential energy at 8 in FIG. 2 is wasted as pressure drop across automatic throttle valve 9. The total kinetic energy of the spray reduces as the cube root of flow, and in this case it is only 0.8% of the energy at full spray flow.

In the above case of a reversed jet operating at 20% of its capacity, it is highly likely that the presumed jet would never form a contact zone 2 within the confining wall of pipe 6 in FIG. 2. Instead, a feeble spray 7 would most likely be deflected toward a down-stream area 5 without good contacting with gas 3.

This Invention

This invention is a method and the equipment needed to harness energy dissipated at throttle valve 9 in FIG. 2 when spray nozzle 4 is called upon to deliver less than its maximum capacity for fluid flow. By this invention energy now lost at throttle valve 9 is used to give constant and maximum velocity to fluid 7 which in turn supplies constant and maximum kinetic energy to a contact zone 2 per unit mass of spray flow. This energy is then used to sustain a high level of turbulence and surface area between fluids 3 and 7 in contact zone 2. By this invention the kinetic energy of a spray 7A in FIG. 3 per unit mass of sprayed fluid is constant and maximum for the available potential energy at 8 over the spray's full flow range. It is also a feature that the included angle of the spray at maximum flow can be predetermined by simple variations to a basic design. Also, by choice of versions it is possible within limits to characterize the spray's change of spray angle with changes in flow. Another feature is that the included angles of the sprays from all versions of the invention decrease with decreasing flow. As a result, the cross sectional area of the spray decreases with decreasing flow to approximately maintain a constant momentum per unit cross-sectional area of the spray. This reduction of spray area approximately compensates for the spray's decrease in total kinetic energy with decreasing flow and results in an approximately constant location for contact zone 2.

Method

The method of this invention substitutes a combined spray nozzle and throttle valve shown as a single structure 16 in FIG. 3 to replace both throttle valve 9 and spray nozzle 4 in FIG. 2. The spray nozzle combined with a throttle valve is also named here as a nozzle valve for brevity. FIG. 4 shows a cut-away view of a nozzle valve. Six versions of nozzle valves are presented in series, starting with the basic Version I. Body vanes 21, plug vanes 25, spiral plug vanes 41 and a valve plug guide 22 are added to Version I as needed to obtain the other five versions. Each version produces a unique spray angle and or spray characteristic.

Version I Viewing FIG. 4, a Version I nozzle valve comprises an enclosing axially-aligned valve body 18 with a side fluid inlet 28. A plenum area 38 allows radial distribution of fluid flowing in enclosing body 18. An axially-mounted outlet orifice 33 and an axially-mounted seal-movable valve plug 19 working together form a variable area annular spray outlet. Flow rate from the nozzle valve is controlled by the degree of penetration of tapered valve plug 19 into orifice 33. A conventional hand wheel or preferably a conventional automatic valve operator 14 is added to stroke valve plug 19. This Version I nozzle valve produces a spray cone angle ranging from substantially 25 degrees to 5 degrees as valve position goes from fully open to near closed. The spray characteristic of this Version I nozzle valve is shown by curve F in FIG. 6A.

Version II Starting with Version I, a second version of nozzle valve adds multiple longitudinal equally-spaced radial body vanes 21 abutted against an orifice plate 20 and truncated to allow plenum area 38 in valve body 18. Body vanes 21 have an outside diameter substantially equal to the inside diameter of body 18. The inside diameter (D) of vanes 21 has a predetermined range from one times the diameter of orifice 33 (d) to 2.4 times the diameter of orifice 33 (d) to give a range of full flow spray cone angles from 15 degrees to 25 degrees. Body vanes 21 with D/d less than 2.4 serve to reduce the tangential component of flow approaching the annular outlet of nozzle valve 16 to give spray cone angles as shown by curves E and F in FIG. 6A. FIG. 6B shows full flow spray cone angles for values of D/d between 1.0 and 2.4.

Version III A third version of nozzle valve requires body vanes 21 as described above with D/d equal 1.0. This allows only a substantially radial component 40 in flow approaching spiral vanes 41 in FIG. 8A. Equally-spaced multiple longitudinal radiating spiral plug vanes 41 as shown by FIG. 8 and 8B are added to valve plug 19. Spiral vanes 41 have an outside diameter substantially equal to the inside diameter (d) of orifice 33. Spiral vanes 41 added to valve plug 19 in conjunction with body vanes 25 are used to predetermine the tangential and radial components of fluid flow approaching the annular exit orifice between valve plug 19 and orifice 33. By pre selecting the spiral angle of vanes 41, spray from the nozzle valve is characterized as shown by FIGS. 8B and 8C. These FIGS. show spiral vanes 41 with their spiral angles ranging from 0 degrees to thirty degrees so as to give full flow spray cone angles ranging substantially from 7 degrees to fifty degrees. Spiral angle is referenced to the longitudinal axis of valve plug 19. This third version of nozzle valves results in sprays that substantially maintain their full flow spray cone angle down to approximately 40% of full flow. Further reductions in flow result in a reduction in spray cone angle as shown by FIG. 8B.

Version IV A fourth version of nozzle valve has body vanes 21 with D/d equal to 1.0. Body vanes 21 and straight plug vanes 25 (no spiral) are matched in number and geometry. With only random alignment of plug vanes 25 and body vanes 21, full flow spray angle will vary from substantially five degrees when vane edges are aligned to substantially ten degrees when plug vanes 25 and body vanes 21 bisect each other for maximum non-alignment. The condition of vane edge alignment is shown by FIG. 4A with the resulting spray characteristic shown by FIG. 4B. Maximum vane non-alignment is shown by FIG. 5 with the resulting flow characteristic shown by FIG. 5A.

Version V A fifth version of nozzle valve results from adding valve plug guide 22 to maintain edge alignment between body vanes 21 and plug vanes 25 so as to produce a full flow spray cone angle of substantially 5 degrees. The vane alignment of this version is shown by FIG. 4A and the resulting spray characteristic by FIG. 4B. Version V is shown by FIG. 4.

Version VI A sixth version of nozzle valve results when matched body vanes 21 or plug vanes 25 are rotated as a unit and fixed in position so that the edges of body vanes 21 bisect the edges of plug vanes 25 so as to produce a full flow spray cone angle of substantially 10 degrees. The vane alignment of this version is shown by FIG. 5 and the resulting spray characteristic by FIG. 5A.

Energy to Contact Zone 2

Since pressure drop across orifice 33 in FIG. 4 is substantially constant regardless of the position of valve plug 19, the velocity of a fluid jet leaving orifice 33 will be constant at all flow rates. This constant jet velocity makes energy to contact zone 2 in FIG. 3 constant per unit mass of spray flow over the full flow range of the nozzle valve. This constant energy is shown graphically by curve C in FIG. 3A. As a result, the contacting efficiency of the reversed jet installation using nozzle valve 16 in FIG. 3 remains at its maximum for the potential energy available at 8 for all spray flows. As a comparison, the installation in FIG. 2 will show a substantial loss in contacting efficiency as the kinetic energy of spray 7 on a unit mass basis decreases as shown by curve A in FIG. 2A.

Figure 3:
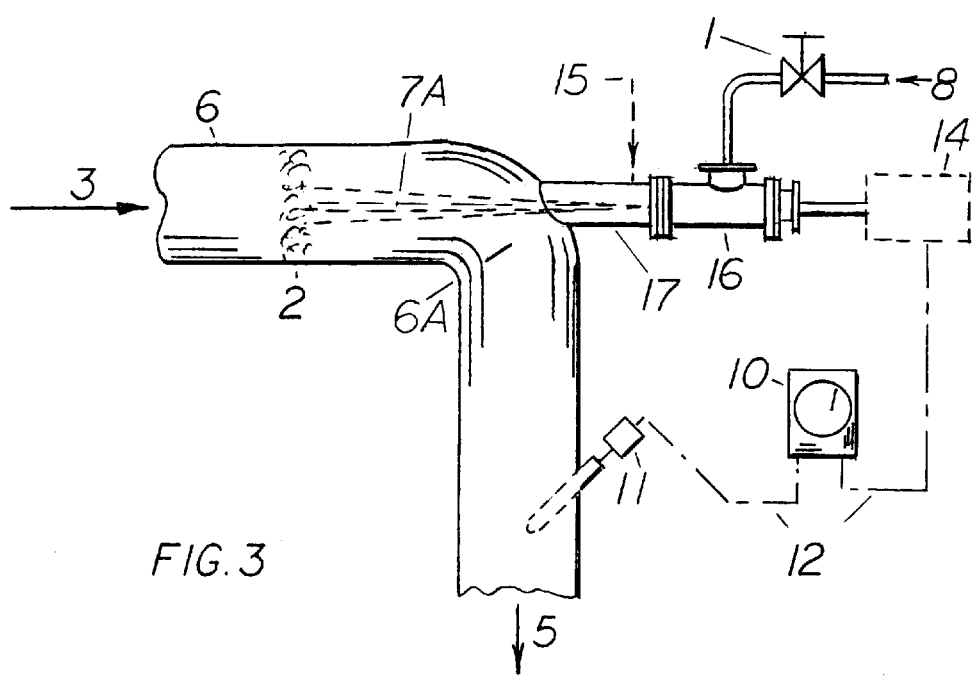

Curve B in FIG. 2A shows the decrease in total kinetic energy in spray 7 with the present method for throttling a reversed jet in FIG. 2. Curve D in FIG. 3A shows the decrease in total kinetic energy in spray 7A as delivered by nozzle valve 16 in FIG. 3. In both cases total kinetic energy in the spray decreases as spray flow decreases. However, curve B in FIG. 2A for a conventional spray nozzle and separate throttle valve decreases as the cube root of spray flow. Curve D in FIG. 3A shows a linear decrease in the spray's total kinetic energy when using a nozzle valve.

Another major related difference between a conventional spray nozzle and a nozzle valve is that the spray cone angle from a conventional non-adjustable nozzle remains substantially constant over its flow range. In contrast the spray cone angle from a nozzle valve decreases as flow decreases, which is shown by FIGS. 4B, 5A, 6A and 8B. This decreasing spray cone angle acts to concentrate the spray's energy so that the penetration distance of the spray to contact zone 2 remains approximately constant even though spray flow is varying. It is believed that contact zone 2 forms where the momentum of the cross section of the spray cone and of the opposing gas are equal on a unit area basis. Therefore for a conventional spray nozzle where the cone angle is substantially constant, contact 2 zone moves toward the nozzle as the spray's flow and its consequent momentum per unit area decreases.

As flow is decreased in the conventional installation of FIG. 2, contact zone 2 can quickly retreat from the confining area of pipe 6 to an elbow area 6A where the low energy spray is deflected to downstream area 5 and poor contact with gas 3 results. With a nozzle valve, the decrease in total energy is much less as shown by curve D in FIG. 3A, Also, its decreasing spray cone angle with decreasing flow reduces the cross sectional area of the spray cone to maintain its momentum on a unit area basis. Another good and bad feature of a nozzle valve is that drop size in spray 7A decreases as the dimensional clearance between valve plug 19 and orifice 33 in FIG. 4 closes to reduce flow. The smaller drops have more surface area for better contacting with gas 3, but this also gives them more drag and consequently less penetrating power against opposing gas stream 3. The decreasing spray cone angle with decreasing flow from a nozzle valve approximately compensates for the smaller drop size and for the reduced total kinetic energy as the spray's flow is reduced. Because of the higher total energy in the spray from a nozzle valve and its decreasing spray cone angle with decreasing flow, the distance from a nozzle valve to contact zone 2 remains approximately constant with changes in spray flow.

Spray Cone Angels

In a nozzle valve, flow approaching the annular outlet from a radial direction results in a narrow spray cone angle. Flow approaching from a tangential direction results in a wide spray cone angle. Various predetermined combinations of these flow components are used to establish the Included angle of spray 7A at full flow to cope with a variety of operating conditions. Vane configurations and typical resulting spray cone angles as function of flow are shown by FIGS. 4A and 4B, 5 and 5A, 6 and GA, 8A and 8B. All of these vane configurations result in a spray cone having a round cross section with a substantially uniform drop distribution. This type of spray is commonly referred to as a ■solid cone■ or ■full cone■ spray. Qualitative indications of combined tangential and radial components 40 in flow approaching the nozzle valve's outlet are also shown in the above figures.

The placement of vanes to predetermine the tangential and radial flow components of fluid approaching the annular outlet orifice of a nozzle valve effectively allows characterization of its outlet spray cone as shown by the above FIGS.

The addition of vanes to valve plug 19 causes a profound change in the spray's character. ■Character■ is used here to mean its change in spray cone angle with change in flow. This change in character of the spray becomes evident by comparing curves E and F in FIG. 6A which result from body vanes only, with corresponding curves in FIGS. 4B, 5A and 8B which result from both body vanes 21 and plug vanes 25 or 41.

When there are only body vanes as in Version II, the reduction of spray cone angle at low flows comes about because body vanes alone are only effective in reducing tangential flow around the valve plug when the annular opening is near the closed position. At very low flows there is not enough motion in fluid approaching the annular opening to produce any significant tangential velocity around valve plug 19. As the valve opens and space between body vanes 21 and valve plug 19 increases, there is increasingly more space for tangential flow around the valve plug which leads to a wide spray cone angle. By adding vanes 21 or 41 to the valve plug which inhibits tangential flow in the open valve position, there is a significant reduction of the spray cone angle at open and near open valve positions. The number of vanes on the valve plug need not match those in the body, but the most reduction of tangential flow occurs when the body vanes and plug vanes are numerically equal, symmetrical and matched with their edges aligned.

Versions of Nozzle Valves and Their Preferred Applications

Figure 6:
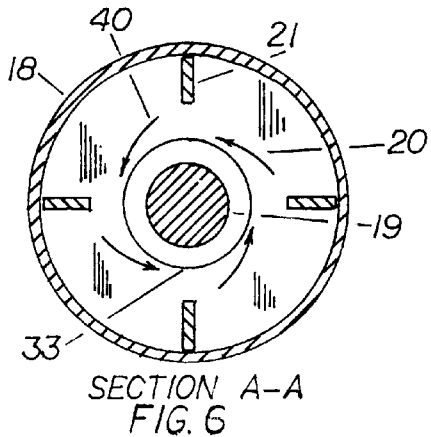
Figure 6A:
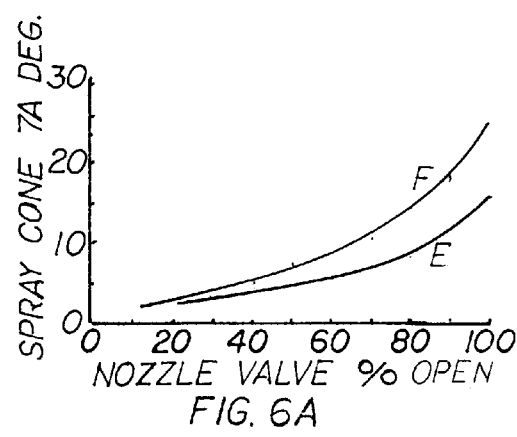

Three groups of nozzle valves provide different spray cone angles and characterizations to meet the needs of different reversed jet installations. Version I with no vanes typically produces a 25 degree spray cone at full flow with characterization as shown by curve F in FIG. 6A. Version II with pre-selected widths for body vanes 21 produces full flow spray cone angles typically from 25 to 15 degrees depending upon the selected inside diameter of body vanes 21 as shown by FIG. 6. FIG. 6A shows the character of these sprays. Curve F is for D/d=2.4. Curve E is for D/d=1.0.

Versions I and II are most suitable for installations where:
  There is an erosive or corrosive component in the spray fluid which makes the maintenance of vanes 25 on plug 19 a significant cost or operating penalty.
  There is little need for isolation of nozzle valve 16 from gas 3 so that extension 17 can be of a relatively large diameter to accommodate a wide (15 to 25 degrees) spray cone at full spray flow.
  The velocity of gas 3 is substantially above the minimum flooding velocity for all operating conditions.
  The length of pipe 6 is adequate to insure a reversal of spray 7A within pipe 6 for all conditions without intrusion into upstream equipment such as shown by a tank 45 in Pig.7 For example. A length of ten pipe diameters will usually meet this requirement.

Figure 8C:
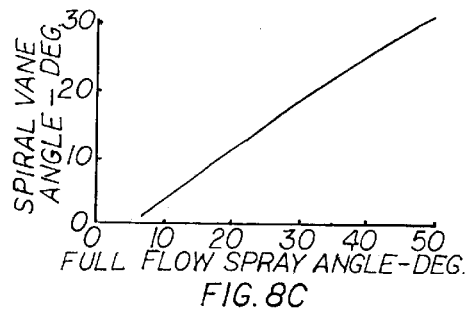
Figure 8A:
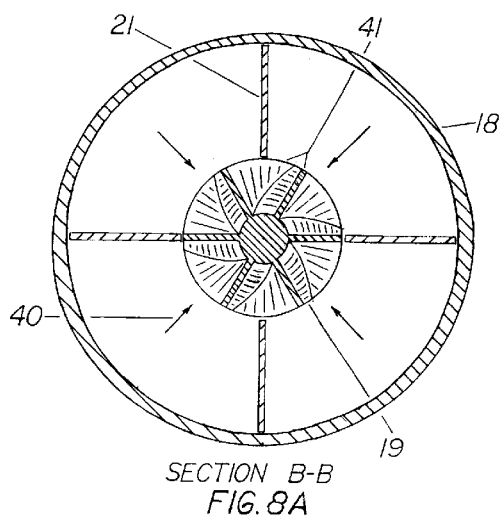
Figure 8B:
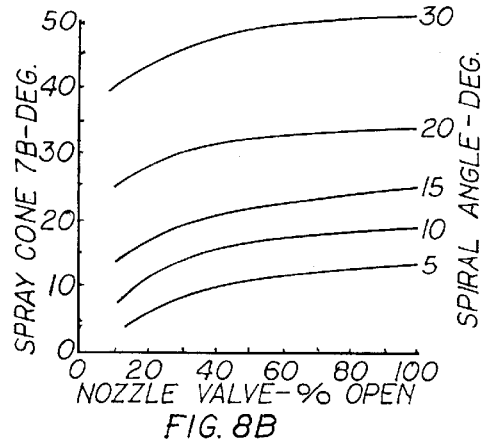

Version III uses multiple spiral plug vanes 41 superimposed on valve plug 19 together with body vanes 21 having a D/d equal to 1.0. This version produces a large range of spray angles and characteristics as shown by FIGS 8B and 8C.

A Version III nozzle valve with an 8 degree spiral angle gives a nearly constant cross sectional spray momentum at a given distance from the nozzle valve. This results in an approximately stationary contact zone 2 in FIG. 7 if the momentum or velocity of gas 3 is constant when there is a decreasing demand for spray. If a decreasing velocity of gas 3 is all or partly causing the decreased demand for spray, then more spiral angle for the vanes on valve plug 19 can be used to give a decreasing spray momentum with decreasing spray flow so that the distance from nozzle valve 16A to contact zone 2 will remain constant. Version III is most suitable for an installation where:

- The velocity of gas 3 is only marginally above the minimum flooding velocity.
- There is minimal length of pipe 6 between a nozzle valve 16A and an upstream piece of equipment such as tank 45 for example as shown by FIG. 7.
- The spray fluid is relatively free of erosive or corrosive components so that the cost or operating penalty for maintaining spiral vanes 41 on valve plug 19 is not prohibitive.
- A general purpose variable-flow solid-cone spray is needed which substantially maintains its full flow spray cone angle down to 40% of its full flow. A Version III nozzle valve is suitable for a concurrent spray for example.

Versions IV, V and VI all produce spray cone angles of less than 10 degrees at full spray flow, and the range of their flow characteristics is shown by FIGS. 4B and 5A. Version IV has no plug guide, and its cone angle can vary typically from 5 degrees to 10 degrees depending upon the random alignment of its body vanes 21 and its plug vanes 25. Version V with its vane edges aligned by a plug guide typically produces a 5 degree spray cone. Version VI with its vane edges guided for maximum non-alignment typically produces a 10 degree spray. Versions IV, V and VI are most suitable where:

- There is need for a narrow cone spray angle so that nozzle valve 16 in FIG. 3 can be isolated from a hostile gas 3 by a suitably long and small diameter extension 17.
- The velocity of gas 3 is substantially above the minimum flooding velocity at all operating conditions.
- The length of pipe 6 is sufficient to insure a complete reversal of spray 7B within pipe 6 without intrusion into upstream equipment such as shown by tank 45 in FIG. 7 for example. A length of ten pipe diameters will usually meet this requirement.

DRAWING FIGURES

FIG. 1 shows an elbow configuration for a counter-current or reversed jet installation.

FIG. 2 shows the present method for automating the installation of FIG. 1 to maintain a predetermined downstream temperature.

FIG. 2A shows the percent conversion of potential energy in fluid supply 8 to kinetic energy in spray 7 using the configuration of FIG. 2. Curve A is on a unit mass basis, and curve B is on a total kinetic energy basis. Both curves are functions of percent flow to spray 7.

FIG. 3 shows a nozzle valve used as a reversed jet in an elbow configuration.

FIG. 3A shows the percent conversion of potential energy in fluid supply 8 to kinetic energy in spray 7A using the nozzle valve configuration of FIG. 3. Curve C is on a unit mass basis, and curve D is on a total kinetic energy basis. Both curves are functions of percent flow to spray 7A.

FIG. 4 shows a Version V nozzle valve. This Version produces a very narrow spray cone angle which is typically 5 degrees at maximum flow from the valve. Vanes 21 and 25 are altered and/or removed to produce alternate full-flow spray cone angles and spray characterizations.

FIG. 4A shows cross section A—A in FIG. 4 which is the vane arrangement in the most narrow spray angle nozzle valve.

FIG. 4B shows a typical variation in spray cone angle with changes in flow from the nozzle valve of FIG. 4 using the vane arrangement shown by FIG. 4A.

FIG. 5 shows non-alignment between body vanes 21 and plug vanes 25. This allows some tangential flow component 40 in flow approaching the nozzle valve's annular outlet.

FIG. 5A shows a typical variation in spray cone angle with changes in flow as caused by the non-aligned vane orientation shown by FIG. 5.

FIG. 6 shows partial body vanes 21 which allow combined tangential and radial components in flow 40 approaching the nozzle valve's annular outlet.

FIG. 6A shows typical variations in spray cone angle with changes in flow as caused by using only multiple body vanes 21 as shown by FIG. 6. Curves E and F show the change in spray angles as the inside diameter of vanes 21 is increased from D/d=1.0 for curve E to D/d=2.4 for curve F. Where d=ID of orifice 33 and D=ID of multiple body vanes 21.

FIG. 6B shows intermediate full flow spray cone angles that result when D/d is increased from 1.0 to substantially 2.4.

FIG. 7 shows an installation where a narrow cone spray may not be suitable.

FIG. 8 shows multiple spiral vanes 41 superimposed on valve plug 19.

FIG. 8A shows a typical cross section B—B in FIG. 4 when multiple spiral vanes 41 are superimposed on valve plug 19.

FIG. 8B shows typical spray cone angles as functions of spray flow using spiral vanes 41 with various spiral angles on valve plug 19.

FIG. 8C shows full-flow spray cone angles as a function of the spiral angle of multiple spiral vanes 41. Spiral angle is referenced to a line parallel to the longitudinal axis of valve plug 19.

PHYSICAL DESCRIPTION OF A NOZZLE VALVE

Version I

The Version I nozzle valve serves as the starting point for the other five versions which result from the addition and/or form of body vanes 21, plug vanes 25, spiral plug vanes 41 and plug guide 22.

Valve body 18 shown in FIG. 4 takes the form of a flanged ■Tee■ having two on-axis openings and one off-axis inlet opening. Valve body 18 can take an alternate configuration such as a clean-out ■wye■ for example. Also, smaller sizes of this nozzle valve can be made using screw connections.

Fluid to be sprayed enters valve body 18 at an off-axis side flange 28 and exits to the left through on-axis orifice 33. Orifice plate 20 is retained in a recess machined into an outlet flange 29. Outlet flange 29 and a mounting flange 30 are drilled with an extra set of holes. Every-other hole 31 in flange 30 is threaded so that bolts through outlet flange 29 clamp orifice plate 20 in any pre-determined position. The remaining bolt holes 32 are used to mount nozzle valve 16 in FIG. 3 to extension 17.

An on-axis closure flange 35 is attached to valve body 18 at an on-axis body flange 34. A boss 37 for accepting the mounting yoke of a valve actuator 14 is fixed to the outer side of closure flange 35. The inside of boss 37 is machined to carry a valve stem packing 26 and a packing follower 39. Valve plug 19 is fixed to a valve stem 27, and valve stem 27 is connected to valve actuator 14. In operation, tapered valve plug 19 penetrates orifice 33 to form a variable-area annular outlet. The flow characteristic of valve plug 19 is not critical to a nozzle valve's operation, but a profile that gives a linear change in open area with valve stroke has proven satisfactory. The length of valve stroke itself is not critical, but a valve stroke equal to twice the orifice diameter has proven satisfactory.

An area 38 in FIG. 4 refers to an inlet plenum section of valve body 18 where incoming fluid through side flange 28 is given a chance to distribute itself radially before it reaches outlet orifice 33. The length of plenum area 38 is not critical, but a length equal to one and one half times the diameter of orifice 33 (d) has proven sat is factory.

A selected valve actuator 14 has its stroke equal to the travel of valve plug 19, and its actuating force should be greater than the maximum unit pressure drop across orifice 33 times the area of orifice 33.

Version I produces a full flow spray cone angle of substantially 25 degrees, characterized as shown by curve F in FIG. 6A.

Version II

Figure 6B:
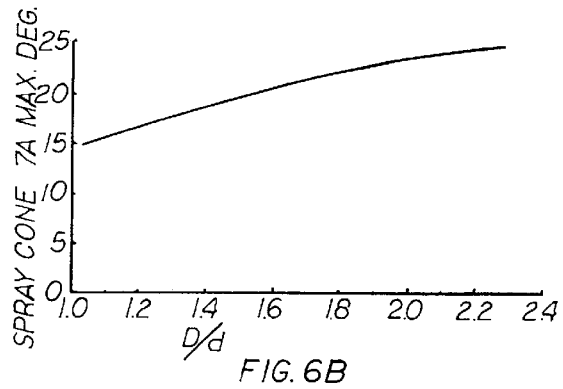

Starting with Version I, multiple equally-spaced longitudinal body vanes 21 are radially attached to orifice plate 20. This assembly of vanes 21 mounted on orifice plate 20 facilitates predetermined alignment of the vanes and also their easy removal. There may be four of these body vanes for example. Clearance between the inside wall of valve body 18 and the outside diameter of vanes 21 is minimum to prevent significant leakage past the vanes. The inside diameter of body vanes 21 (D) equals the diameter of orifice 33 (d) except when an intermediate full flow spray cone angle between 15 and 25 degrees is pre selected as indicated by FIG. 6B. The length of body vanes 21 is not critical, but a length equal to one orifice diameter has proven satisfactory.

FIG. 6 shows body vanes 21 spaced away from valve plug 19. This space allows more tangential component and less radial component in flow 40 approaching the annular outlet between plug 19 and orifice 33. Curves E and F in FIG. A show typical spray cone angles as a function of flow from Version II nozzle valves. Curve E represents multiple body vanes 21 close to valve plug 19 where D/d=1.0. Curve F represents maximum spacing between the outside diameter of plug 19 and the inside diameter of vanes 21 where D/d=2.4. This range of full flow spray cone angles is shown by FIG. 6B where d=inside diameter of orifice 33 and D=vane 21 inside diameter. Values of D/d greater than 2.4 show little effect on spray cone angle, and so this value establishes a reasonable minimum diameter for valve body 18 in FIG. 4.

Version III

Figure 8:
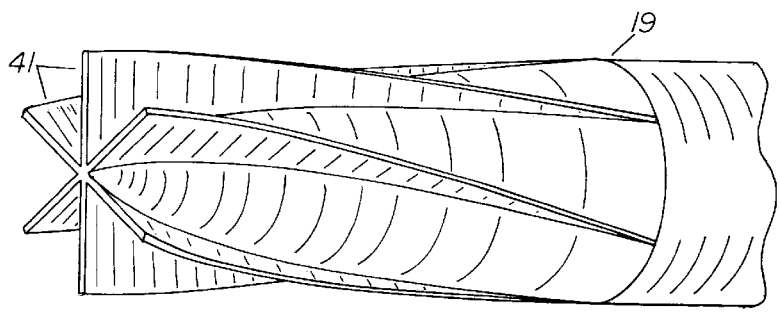

The third version of nozzle valve adds multiple equally-spaced spiral vanes 41 superimposed on valve plug 19 as shown by FIG. 8. Spiral vanes 41 are of maximum diameter to pass freely through orifice 33, and their length substantially equal to that of valve plug 19 plus the thickness of orifice plate 20 to guide valve plug 19 into orifice 33. There may be six spiral vanes 41 on valve plug 19 for example. Multiple body vanes 21 with a D/d of 1.0 allow only a substantially radial component 40 in flow approaching spiral vanes 41 in FIG. 8A. FIG. 8C shows the full flow spray angle obtained as a function of the angle of spiral vanes 41, where the spiral angle is referenced to the longitudinal axis of valve plug 19. FIG. 8B shows the variation in spray cone angle with changes in flow from several sprays with different spiral angles. These nozzle valves substantially hold their initial spray cone angle from 100% of flow down to approximately 40% of flow. Further reductions in flow result in a reduction in spray cone angle as shown by FIG. 8B.

Figure 7:
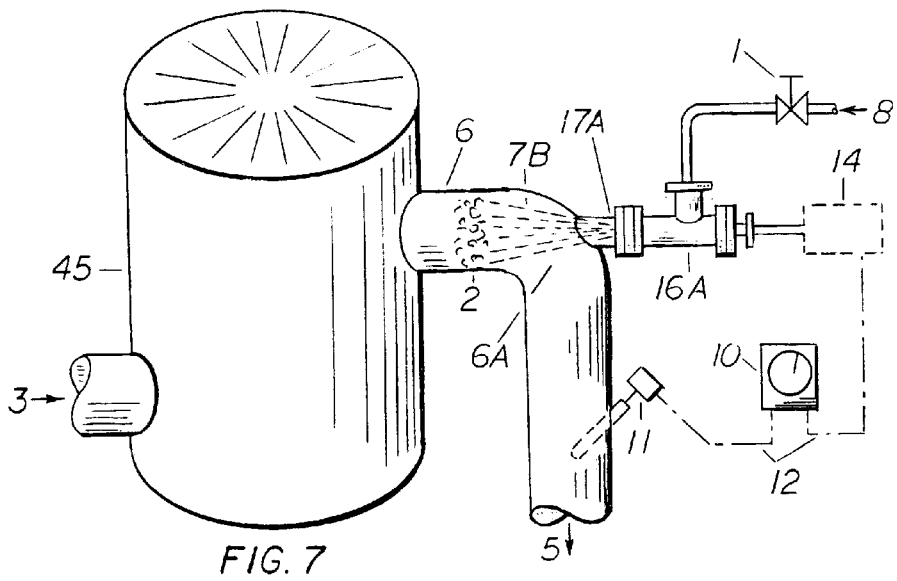

The nozzle valve in FIG. 4 is preferred when the length of pipe 6 in FIG. 3 and the momentum of gas 3 are sufficient to insure a complete reversal of spray 7A under all conditions. However, some conditions exist which make the narrow spray cone angle produced by the nozzle valve of FIG. 4 impractical. FIG. 7 shows such a case. If a narrow cone angle spray is used at high flow rates when the total or absolute kinetic energy of the spray is maximum in FIG. 7, pipe 6 may be too short to insure the formation of contact zone 2 before the spray enters large process vessel 45. A solution for the problem shown by FIG. 7 is to widen the included angle of a spray cone 7B at high and low spray flows so that contact zone 2 will form closer to an elbow 6A. Version III nozzle valves are suitable for this service, and FIGS. 8B and 8C can be used to pre-determine the spiral angle needed for vanes 41 to obtain a desired spray cone angle. In FIG. 7, pipe extension 17A has been shortened to accommodate a wider spray angle with some loss of a nozzle valve 16A's isolation from process gas 3.

Version IV

In Version IV body vanes 21 have a D/d=1.0, and there are an equal number of matching longitudinal plug vanes 25 with no spiral which are fixed to valve plug 19. Plug vanes 25 are of maximum diameter to pass freely through orifice 33, and they are substantially equal in length to the stroke of valve plug 19. In the nozzle valve's fully opened position (as shown in FIG. 4) vanes 25 extend beyond the tip of valve plug 19 by an amount equal to the thickness of plate 20 so that plug 19 is guided into orifice 33.

A Version IV nozzle valve produces a range of full flow spray cone angles from 5 degrees to 10 degrees depending upon the random or chance alignment of plug vanes 25 with body vanes 21. FIGS. 4A and 4B show the position and flow characteristics for edge alignment. FIGS. 5 and 5A show the position and flow characteristics when the edges of vanes 21 and 25 bisect each other for maximum non-alignment.

Version V

The nozzle valve described as Version IV is operable, but the included angle of its spray will vary depending upon the random edge alignment of body vanes 21 with plug vanes 25. To achieve a constant spray cone angle, valve plug guide 22 is added to Version IV to insure edge alignment of vanes 21 and 25 as shown in FIG. 4A.

A tubular valve guide 22 embodying one or more longitudinal guide slots 23 is fixed to the inner side of closure flange 35. One or more guide lugs 24 fixed to valve plug 19 slide in guide slot (s) 23 to achieve edge alignment between vanes 25 and vanes 21. A vent hole 44 in guide 22 releases any trapped fluid that might slow the movement of valve plug 19. Guide 22 also acts as a shield to protect valve plug 19 from possible erosion caused by solids in fluid entering the nozzle valve through inlet flange 28.

FIG. 4B shows Version V's typical spray cone angle as a function of flow. Note in FIG. 4A, with edge-aligned close-fitting vanes, the flow pattern 40 of liquid approaching the annular outlet between valve plug 19 and orifice 33 is essentially all radial. This radial flow to the outlet typically produces a 5 degree spray cone angle at full flow as shown by FIG. 4B.

Version VI

Figure 5:
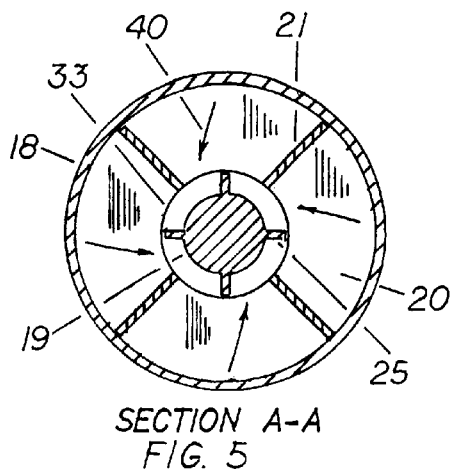
Figure 5A:
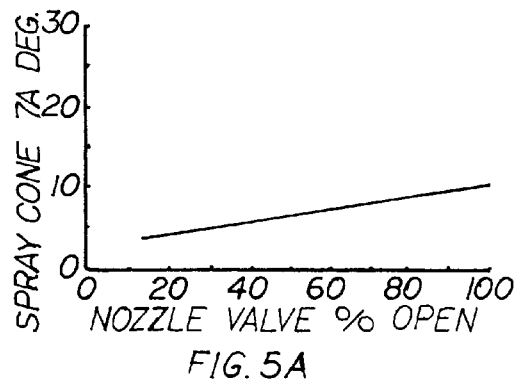

By loosening clamping bolts using threaded holes 31 in FIG. 4, orifice plate 20 which carries body vanes 21 can be rotated to an intermediate vane position such as shown by FIG. 5. Clamping bolts are then tightened to fix orifice plate 20 between flanges 29 and 30. This intermediate vane position is used to produce a typically wider spray cone of 10 degrees at full flow as shown by FIG. 5A. Guide lug(s) 24 in slot(s) 23 maintain vane alignment. Note that qualitative flow pattern 40 in FIG. 5 is primarily composed of a radial component with a small tangential component.

Features of a Nozzle Valve and its Installation

FIG. 3 shows a typical, but not limiting, installation of combined spray nozzle and throttle valve 16 described as this invention and shown in detail in FIG. 4. Nozzle valve 16 in FIG. 3 with an operator 14 is mounted outside process pipe 6 on an extension pipe such as 17.

Extension 17 is an axial extension of process pipe 6. The length and diameter of extension 17 can be a critical part of the installation. By making extension 17 long and small in diameter it provides a means to isolate the materials of nozzle valve 16 from a possibly erosive and or corrosive and or high temperature process gas 3. The length and inside diameter of extension 17 should be picked to give at least 20% of free space between the spray at its maximum spray angle and the inside wall of extension 17. If necessary, an inert gas purge such as 15 in FIG. 3 can be added to further isolate nozzle valve 16 from process gas 3. A narrow spray angle 7A from nozzle valve 16 at substantially all flow rates is necessary to make use of pipe extension 17 as a means to mount and isolate nozzle valve 16.

The use of a relatively short axial-extension from a process elbow such as 17A in FIG. 7 for mounting a conventional reversed jet nozzle has been established (Kilgren et al U.S. Pat. No. 4,066,424 1978). However, because of its moving parts, the isolation of a nozzle valve from process gas is more critical than for a conventional reversed jet nozzle as seen in FIG. 2.

What is claimed is:

1. A method to sustain substantially constant and maximum kinetic energy to the contact zone of a reversed jet system per unit mass of sprayed fluid where the sprayed fluid's flow will be throttled as needed for process control reasons and where said maximum kinetic energy is substantially equal to the potential energy of fluid supplied to said spray, said method comprises combining a throttle valve and a spray nozzle into a single-structured nozzle valve as a means to maintain a constant sprayed fluid velocity as a means to maintain a constant kinetic energy in said sprayed fluid per unit mass flow of said sprayed fluid, said method further comprising radially distributing said fluid in an enclosing axially-aligned valve body, jointly forming a variable-area annular spray outlet with an axially-mounted orifice plate outlet and a seal-movable axially-mounted valve plug, and stroking said valve plug.

2. A method to sustain substantially constant and maximum kinetic energy to the contact zone of a reversed jet system per unit mass of sprayed fluid where the sprayed fluid's flow will be throttled as needed for process control reasons and where said maximum kinetic energy is substantially equal to the potential energy of fluid supplied to said spray, said method comprises combining a throttle valve and a spray nozzle into a single-structured nozzle valve as a means to maintain a constant sprayed fluid velocity as a means to maintain a constant kinetic energy in said sprayed fluid per unit mass flow of said sprayed fluid, said nozzle valve comprising an enclosing axially-aligned valve body, a side fluid inlet, a plenum area as a means to radially distribute said fluid in said enclosing body, an axially-mounted orifice plate outlet and a seal-movable axially-mounted valve plug, said orifice plate and said valve plug jointly forming a variable-area annular spray-outlet, and a means for stroking said valve plug.

3. The method of claim 2 further comprising multiple equally-spaced longitudinal radiating body vanes additionally added to the inside of said valve body, said body vanes being abutted to said orifice plate and having an outside diameter substantially equal to the inside diameter of said valve body, said body vanes being truncated to allow said plenum area, said body vanes having a predetermined inside diameter (D) ranging from one times said orifice's diameter (d) up to 2.4 times said orifice's diameter, said range of inside diameters serving as means to reduce the tangential flow component of fluid approaching said annular orifice as a means to predetermine the full-flow included spray cone angle of said spray, said full-flow spray cone angle ranging from substantially fifteen degrees to twenty-five degrees when D/d ranges from 1.0 to 2.4.

4. The method of claim 3 wherein said equally-spaced multiple longitudinal radiating body vanes in said body of said nozzle valve have a D/d equal 1.0, multiple equally-spaced longitudinal radiating spiral vanes being additionally added to said valve plug of said nozzle valve as a means to generate wider predetermined spray cone angles particularly at medium and low-flow valve positions, said spiral valve plug vanes having an outside diameter substantially equal to said orifice inside diameter (d), said spiral vanes having spiral angles selectively ranging from zero degrees to thirty degrees as means to give full flow spray cone angles ranging from substantially seven degrees to fifty degrees.

5. The method of claim 4 wherein said multiple longitudinal radiating spiral plug vanes added to said valve plug of said nozzle valve have a spiral angle equal to zero degrees (no spiral) and where said plug vanes numerically and geometrically match said body vanes with random edge alignment of said matched body vanes and plug vanes as a means to substantially reduce the tangential flow component of fluid approaching said annular orifice outlet at open and near open valve positions as a means to reduce said full flow spray cone angle of fluid leaving said nozzle valve, said random vane edge alignment producing full flow spray cone angles substantially ranging from five degrees for vane alignment to ten degrees for maximum non vane alignment.

6. The method of claim 5 further comprising a valve plug guide as a means to insure edge alignment between said matched body and plug vanes as a means to produce a full-flow spray cone angle of substantially five degrees in spray leaving said nozzle valve.

7. The method of claim 6 wherein said matched body vanes or said plug vanes are rotated as a unit and fixed in position so that the edges of said body vanes bisect the edges of said plug vanes as a means to produce a full-flow spray cone angle of substantially ten degrees in spray leaving said nozzle valve.

* * * * *